US008259475B2

(12) United States Patent
Shin et al.

(10) Patent No.: US 8,259,475 B2
(45) Date of Patent: Sep. 4, 2012

(54) POWER SUPPLY CIRCUIT HAVING AC POWER DISCHARGING FUNCTIONS

(75) Inventors: Yun Seop Shin, Gyunggi-do (KR); Ki Eun Lee, Gyunggi-do (KR)

(73) Assignee: Samsung Electro-Mechanics Co. Ltd., Gyunggi-do (KR)

( * ) Notice: Subject to any disclaimer, the term of this patent is extended or adjusted under 35 U.S.C. 154(b) by 0 days.

(21) Appl. No.: 13/037,670

(22) Filed: Mar. 1, 2011

(65) Prior Publication Data

US 2012/0134185 A1 May 31, 2012

(30) Foreign Application Priority Data

Nov. 30, 2010 (KR) .................... 10-2010-0120758

(51) Int. Cl.
*H02M 7/79* (2006.01)
*H02M 7/797* (2006.01)
*H02M 7/81* (2006.01)
(52) U.S. Cl. ......................... 363/44; 363/126
(58) Field of Classification Search .................. 363/44, 363/126
See application file for complete search history.

(56) References Cited

U.S. PATENT DOCUMENTS

| | | | | |
|---|---|---|---|---|
| 4,523,131 A * | 6/1985 | Zansky | ........................ | 315/307 |
| 4,831,508 A * | 5/1989 | Hunter | ........................... | 363/44 |
| 5,148,358 A * | 9/1992 | Estes, Jr. | ........................ | 363/24 |
| 5,661,645 A * | 8/1997 | Hochstein | ........................ | 363/89 |
| 6,061,259 A * | 5/2000 | DeMichele | ........................ | 363/125 |
| 6,980,449 B2 * | 12/2005 | Chang | ............................ | 363/84 |
| 7,154,227 B2 * | 12/2006 | Heckmann | ..................... | 315/194 |
| 2010/0008117 A1 * | 1/2010 | Luthi et al. | ..................... | 363/126 |
| 2010/0309694 A1 * | 12/2010 | Huang et al. | .................... | 363/49 |
| 2011/0122668 A1 * | 5/2011 | Lo et al. | ....................... | 363/126 |

FOREIGN PATENT DOCUMENTS

KR 10-2010-0053799 5/2010

* cited by examiner

*Primary Examiner* — Matthew Nguyen
*Assistant Examiner* — Nusrat Quddus
(74) *Attorney, Agent, or Firm* — McDermott Will & Emery LLP

(57) ABSTRACT

There is provided a circuit for discharging AC power including: a first rectifier rectifying AC power inputted from an AC power line; an electro-magnetic interference (EMI) removing unit installed between the AC power line and the first rectifier to suppress EMI of the AC power; a discharging signal generator generating a discharging signal from the AC power; and a discharging unit including a discharging resistor for discharging a voltage charged in the EMI removing unit according to the discharging signal, whereby standby power consumption may be reduced when the AC power is inputted and the voltage charged in a capacitor for removing EMI may be discharged to meet a predetermined safety standard when the AC power is blocked.

9 Claims, 1 Drawing Sheet

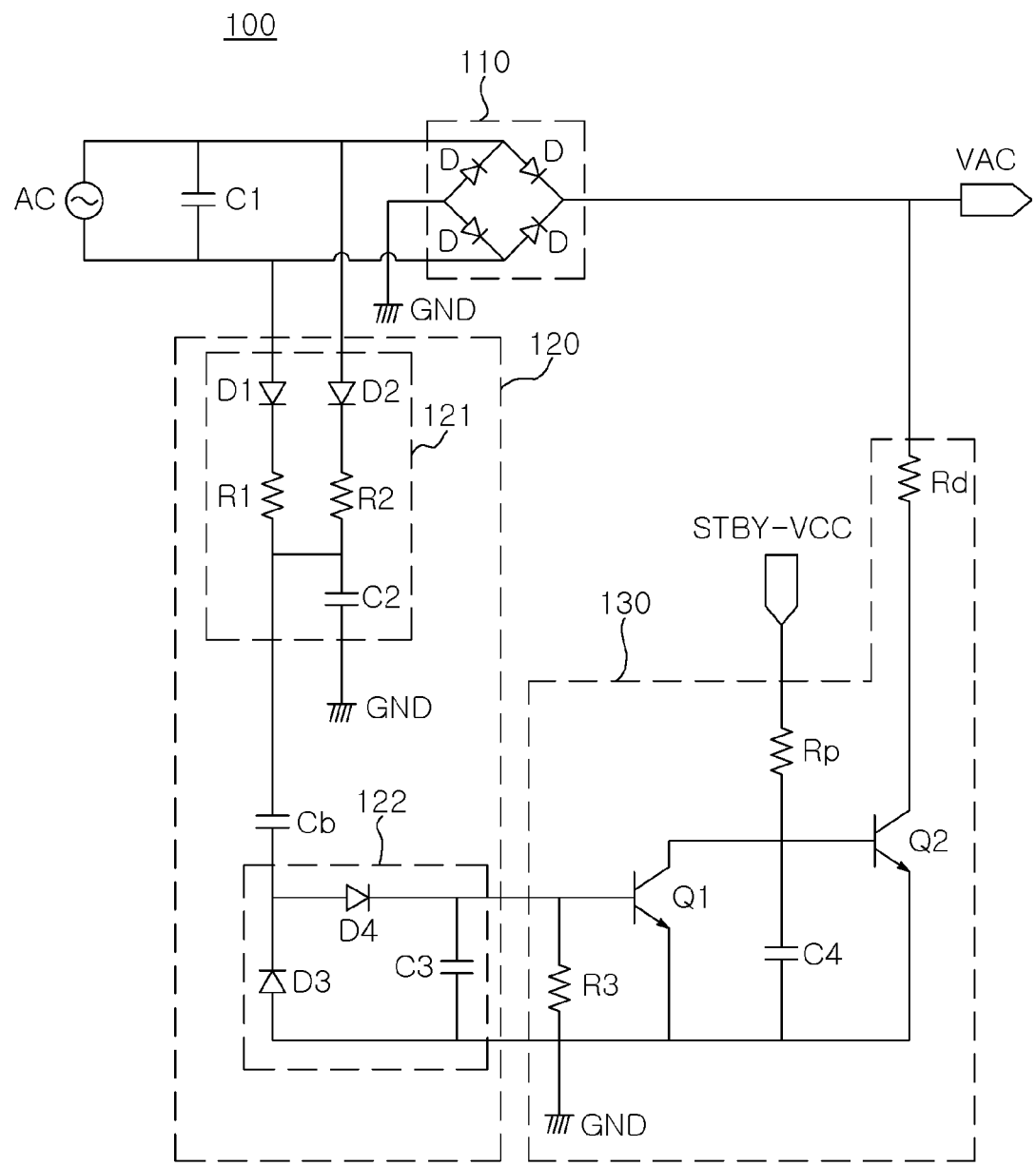

POWER SUPPLY CIRCUIT HAVING AC POWER DISCHARGING FUNCTIONS

CROSS-REFERENCE TO RELATED APPLICATIONS

This application claims the priority of Korean Patent Application No. 10-2010-0120758 filed on Nov. 30, 2010, in the Korean Intellectual Property Office, the disclosure of which is incorporated herein by reference.

BACKGROUND OF THE INVENTION

1. Field of the Invention

The present invention relates to a circuit for discharging AC power, and more particularly, a circuit for discharging AC power capable of minimizing standby power consumption.

2. Description of the Related Art

Interest in the necessity of saving energy has recently increased around the world, and particularly, the awareness of standby power unintentionally consumed when an electronic apparatus is in a standby state has increased. Standby power refers to power consumed to maintain a computer or a home appliance in a preparatory state prior to the computer or the home appliance being normally operated and also refers to power consumed without being actually used when an electrical plug is inserted into a socket. For example, in the case of a product such as a television or a video player operated by remote control, a remote control receiving state, in which the product is turned off but is ready to be turned on when the remote controller is pressed, corresponds to standby power. The entirety of actual power consumed by electronic devices in the inactive states as described above is commonly estimated to make up about 10% of all consumer electricity charges. Accordingly, the demand for a circuit for reducing the consumption of standby power has increased.

Meanwhile, a capacitor is installed in a power supply terminal of an electronic product, that is, an AC power line, in order to suppress electro-magnetic interference (EMI) therein. Particularly, a capacitor installed in a line-to-line scheme in order to filter differential mode noise is called an X-cap and a capacitor installed in a line-to-ground scheme with respect to each line in order to filter common mode noise is called a Y-cap. Since these capacitors are directly connected to the AC power line, they have a safety standard that should be obeyed. According to the safety standard, when the supply of AC power is blocked, voltage charged in the capacitor needs to be discharged within a predetermined time. In addition, since a discharging resistor is additionally connected in parallel with the capacitor for suppressing the EMI connected to an input terminal of the AC power line, when AC power is supplied, a predetermined amount of standby power has continually been consumed.

SUMMARY OF THE INVENTION

An aspect of the present invention provides a circuit for discharging AC power that is capable of reducing standby power consumption when AC power is inputted thereto, and of discharging a voltage charged in a capacitor for removing electro-magnetic interference (EMI) so as to meet a predetermined safety standard when the AC power is blocked.

According to an aspect of the present invention, there is provided a circuit for discharging AC power, the circuit including: a first rectifier rectifying AC power inputted from an AC power line; an electro-magnetic interference (EMI) removing unit installed between the AC power line and the first rectifier to suppress EMI of the AC power; a discharging signal generator generating a discharging signal from the AC power; and a discharging unit including a discharging resistor for discharging a voltage charged in the EMI removing unit according to the discharging signal.

The discharging resistor may be connected between an output terminal of the first rectifier and a ground, and the discharging signal may be generated from a ripple component of a rectified waveform, in which a magnitude of the AC power is reduced.

The discharging signal generator may include a second rectifier generating the rectified waveform in which the magnitude of the AC power is reduced, a blocking capacitor allowing only an AC component of the rectified waveform to pass therethrough, and a third rectifier rectifying a ripple component of the AC component to generate the discharging signal.

The second rectifier may include a first diode having an anode connected to a first line of the AC power line; a first resistor having one end connected to a cathode of the first diode, a second diode having an anode connected to a second line of the AC power line, a second resistor having one end connected to a cathode of the second diode, and a second capacitor having one end connected to the other ends of the first and second resistors and the other end connected to the ground.

The third rectifier may include a third diode having a cathode connected to the blocking capacitor and an anode connected to the ground, a fourth diode having an anode connected to the blocking capacitor, and a third capacitor having one end connected to a cathode of the fourth diode and the other end connected to the ground.

The discharging unit may include a first transistor having a base connected to one end of the third capacitor and an emitter connected to the ground, a second transistor having a base connected to a collector of the first transistor, an emitter connected to the ground, and a collector connected to a standby power supply through a pull-up resistor, and a fourth capacitor connected between the base of the second transistor and the ground.

The first rectifier may include a bridge rectifier circuit configured of four diodes, and the EMI removing unit may include an X-CAP installed in a line-to-line scheme.

According to another aspect of the present invention, there is provided a circuit for discharging AC power including: a first rectifier including a bridge rectifier circuit rectifying AC power inputted from an AC power line; a first capacitor installed in a line-to-line scheme between the AC power line and the first rectifier to suppress electromagnetic interference (EMI) of the AC power; a discharging signal generator including a second rectifier generating a rectified waveform in which a magnitude of the AC power is reduced, a blocking capacitor allowing only an AC component of the rectified waveform to pass therethrough, and a third rectifier rectifying a ripple component of the AC component to generate a discharging signal; and a discharging unit discharging a voltage charged in the first capacitor through a discharging resistor connected between an output terminal of the first rectifier and a ground according to the discharging signal.

The second rectifier may include a first diode having an anode connected to a first line of the AC power line, a first resistor having one end connected to a cathode of the first diode, a second diode having an anode connected to a second line of the AC power line, a second resistor having one end connected to a cathode of the second diode, and a second capacitor having one end connected to the other ends of the first and second resistors and the other end connected to the ground.

The third rectifier may include a third diode having a cathode connected to the blocking capacitor and an anode connected to the ground, a fourth diode having an anode connected to the blocking capacitor, and a third capacitor having one end connected to a cathode of the fourth diode and the other end connected to the ground.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a view showing the configuration of a circuit for discharging AC power according to an exemplary embodiment of the present invention.

DETAILED DESCRIPTION OF THE PREFERRED EMBODIMENT

Hereinafter, exemplary embodiments of the present invention will be described in detail with reference to the accompanying drawings, which will fully convey the concept of the invention to those skilled in the art. Moreover, detailed descriptions related to well-known functions or configurations will be ruled out in order not to unnecessarily obscure the subject matter of the present invention.

FIG. 1 is a view showing the configuration of a circuit for discharging alternating current (AC) power according to an exemplary embodiment of the present invention. A circuit 100 for discharging AC power (hereinafter, also referred to as the "AC discharging circuit") may include a first rectifier 110 rectifying AC power inputted form an AC power line, an electro-magnetic interference (EMI) removing unit C1 installed between the AC power line and the first rectifier 110 and suppressing the EMI of the AC power, a discharging signal generator 120 generating a discharging signal from the AC power, and a discharging unit 130 including a discharging resistor Rd for discharging voltage charged in the EMI removing unit C1 according to the discharging signal.

Hereinafter, the AC discharging circuit 100 according to an exemplary embodiment of the present invention will be described in detail with reference to FIG. 1.

Referring to FIG. 1, the EMI removing unit C1 is installed between the AC power line and the first rectifier 110 and suppresses the EMI of the AC power. The EMI removing unit C1 may include a capacitor X-CAP installed in a line-to-line scheme. When the AC power is inputted, the EMI removing unit C1 repeats charging and discharging according to frequency of the AC power. When the AC power is blocked, the voltage charged in the EMI removing unit C1 is discharged so as to meet a safety standard. According to the safety standard, the voltage charged in the EMI removing unit C1 should be 60V or less within two seconds from a time point at which the AC power is blocked. Accordingly, values of the EMI removing unit C1 and the discharging resistor Rd to be described below need to be designed so as to satisfy the above-mentioned safety standard.

The first rectifier 110 receives and rectifies the AC power and outputs a rectified voltage waveform. Generally, the first rectifier 110 may include a bridge rectifier circuit configured of four diodes as shown in FIG. 1.

The discharging signal generator 120 generates a discharging signal from the AC power, and transfers the generated discharging signal to the discharging unit 130. The discharging signal generator 120 may include a second rectifier 121 generating a rectified waveform in which the magnitude of the AC power is reduced, a blocking capacitor Cb allowing only an AC component of the rectified waveform to pass therethrough, and a third rectifier 122 rectifying a ripple component of the AC component to generate the discharging signal.

More specifically, the second rectifier 121 of the discharging signal generator 120 may include a first diode D1 having an anode connected to a first line of the AC power line, a first resistor R1 having one end connected to a cathode of the first diode D1, a second diode D2 having an anode connected to a second line of the AC power line, a second resistor R2 having one end connected to a cathode of the second diode D2, and a second capacitor C2 having one end connected to the other ends of the first and second resistors R1 and R2 and the other end connected to a ground GND.

The blocking capacitor Cb of the discharging signal generator 120 is installed between the second and third rectifiers 121 and 122, blocks a direct current (DC) component of the rectified waveform outputted from the second rectifier 121 and allows only the AC component to pass therethrough.

In addition, the third rectifier 122 of the discharging signal generator 120 may include a third diode D3 having a cathode connected to the blocking capacitor Cb and an anode connected to the ground, a fourth diode D4 having an anode connected to the blocking capacitor Cb, and a third capacitor C3 having one end connected to a cathode of the fourth diode D4 and the other end connected to the ground.

Meanwhile, the discharging unit 130 may include the discharging resistor Rd connected between an output terminal of the first rectifier 110 and the ground, a first transistor Q1 having a base connected to one end of the third capacitor C3 and an emitter connected to the ground, a second transistor Q2 having a base connected to a collector of the first transistor Q1, an emitter connected to the ground, and a collector connected to a standby power supply STBY-VCC through a pull-up resistor Rp, a fourth capacitor C4 connected between the base of the second transistor Q2 and the ground, and a third resistor R3 connected between the base of the first transistor Q1 and the ground GND.

According to an exemplary embodiment of the present invention, the discharging resistor Rd is configured to be connected between the output terminal of the first rectifier 110 and the ground GND, which is different forma configuration according the related art in which the discharging resistor is connected in parallel with the capacitor C1 for suppressing the EMI of the AC power line. As described above, the discharging resistor Rd is installed between the output terminal of the first rectifier 110 and the ground GND and allows the output terminal of the first rectifier 110 to be disconnected from the ground GND when the AC power is inputted, whereby the amount of standby power consumption may be minimized through the discharging resistor Rd. In addition, the output terminal of the first rectifier 110 is connected to the ground GND when the AC power is blocked, whereby the voltage charged in the EMI removing unit C1 may be discharged within a predetermined time so as to satisfy a predetermined safety standard. A specific operation principle thereof will be described below.

Hereinafter, an operation principle of a circuit for discharging AC power according to an exemplary embodiment of the present invention with respect to each of the case in which the AC power is inputted and the case in which the AC power is blocked will be described in detail with reference to FIG. 1.

(1) Case in which AC Power is Inputted

Referring to FIG. 1, AC power is inputted to the second rectifier 120, and the second rectifier 120 generates a rectified waveform, in which the magnitude of the AC power is reduced, and transfers the generated rectified waveform to the blocking diode Cb. Specifically, the AC power is inputted through the first diode D1 connected to the first line of the AC power line and the second diode D2 connected to the second line thereof, and current is limited by the magnitudes of the first and second resistors R1 and R2. The rectified waveform, in which the magnitude of the AC power is reduced, is generated in the second capacitor C2 by the current flowing through the first and second resistors R1 and R2. The rectified waveform generated by the second rectifier 120 is outputted to the blocking capacitor Cb.

Meanwhile, the blocking capacitor Cb blocks the DC component of the rectified waveform outputted from the second rectifier 121 and allows only the AC component of the rectified waveform to pass therethrough.

Then, the AC component (ripple component) of the rectified waveform outputted from the blocking capacitor Cb may be charged in the third capacitor C3 through the fourth diode D4. The third capacitor C3 is connected between the base and the emitter of the first transistor Q1, and a voltage, charged in the third capacitor C3 when the AC power is inputted, that is, a discharging signal is large enough to turn on the first transistor Q1, such that the first transistor Q1 is turned on. Then, a current flowing through the pull-up resistor Rp by the standby power supply STBY-VCC is bypassed to the first transistor Q1, such that a voltage charged in the fourth capacitor C4 becomes 0V. Meanwhile, the fourth capacitor C4 is connected between the base and the emitter of the second transistor Q2, and the second transistor Q2 is turned off, such that one end of the discharging resistor Rd is disconnected from the ground GND. The standby power consumption may be reduced through the discharging resistor Rd when the AC power is inputted, by the above-mentioned operation principle.

(2) Case in which AC Power is Blocked

Referring to FIG. 1, when AC power is blocked, a voltage charged in the third capacitor C3, that is, a discharging signal is 0. Accordingly, the first transistor Q1 is turned off, and a current flowing through the pull-up resistor Rp by the standby power supply STBY-VCC is charged in the fourth capacitor C4. Meanwhile, the fourth capacitor C4 is connected between the base and the emitter of the second transistor Q2, and the second transistor Q2 is turned on, such that one end of the discharging resistor Rd is connected to the ground GND. Accordingly, a voltage charged in the EMI removing unit C1 is discharged through the discharging resistor Rd. At this time, values of the discharging resistor Rd and the EMI removing unit C1 need to be set to meet the safety standard.

As set forth above, according to the exemplary embodiments of the present invention, a discharging signal is generated from a ripple component of a rectified waveform, in which the magnitude of AC power is reduced, and the discharging of a voltage in a capacitor C1 for removing EMI installed in an AC input line is controlled based on the generated discharging signal, whereby standby power consumption may be reduced when the AC power is inputted, and the voltage charged in the capacitor C1 for removing EMI may be discharged to meet a predetermined safety standard when the AC power is blocked.

While the present invention has been shown and described in connection with the exemplary embodiments, it will be apparent to those skilled in the art that modifications and variations can be made without departing from the spirit and scope of the invention as defined by the appended claims.

What is claimed is:

1. A power supply circuit having AC power discharging functions, the circuit comprising:
   a first rectifier rectifying AC power inputted from an AC power line;
   an electro-magnetic interference (EMI) removing unit installed between the AC power line and the first rectifier to suppress EMI of the AC power;
   a discharging signal generator generating a discharging signal from the AC power; and
   a discharging unit including a discharging resistor for discharging a voltage charged in the EMI removing unit according to the discharging signal
   wherein the discharging resistor is connected between an output terminal of the first rectifier and a ground,
   the discharging signal is generated from a ripple component of a rectified waveform, in which a magnitude of the AC power is reduced, and
   the discharging signal generator includes:
   a second rectifier generating the rectified waveform in which the magnitude of the AC power is reduced;
   a blocking capacitor allowing only an AC component of the rectified waveform to pass therethrough; and
   a third rectifier rectifying a ripple component of the AC component to generate the discharging signal.

2. The circuit of claim 1, wherein the second rectifier includes:
   a first diode having an anode connected to a first line of the AC power line;
   a first resistor having one end connected to a cathode of the first diode;
   a second diode having an anode connected to a second line of the AC power line;
   a second resistor having one end connected to a cathode of the second diode; and
   a second capacitor having one end connected to the other ends of the first and second resistors and the other end connected to the ground.

3. The circuit of claim 1, wherein the third rectifier includes:
   a third diode having a cathode connected to the blocking capacitor and an anode connected to the ground;
   a fourth diode having an anode connected to the blocking capacitor; and
   a third capacitor having one end connected to a cathode of the fourth diode and the other end connected to the ground.

4. The circuit of claim 3, wherein the discharging unit includes:
   a first transistor having a base connected to one end of the third capacitor and an emitter connected to the ground;
   a second transistor having a base connected to a collector of the first transistor, an emitter connected to the ground, and a collector connected to a standby power supply through a pull-up resistor; and
   a fourth capacitor connected between the base of the second transistor and the ground.

5. The circuit of claim 1, wherein the first rectifier includes a bridge rectifier circuit configured of four diodes.

6. The circuit of claim 1, wherein the EMI removing unit includes an X-CAP installed in a line-to-line scheme.

7. A power supply circuit having AC power discharging functions, the circuit comprising:
   a first rectifier including a bridge rectifier circuit rectifying AC power inputted from an AC power line;

a first capacitor installed in a line-to-line scheme between the AC power line and the first rectifier to suppress electro-magnetic interference (EMI) of the AC power;

a discharging signal generator including a second rectifier generating a rectified waveform in which a magnitude of the AC power is reduced, a blocking capacitor allowing only an AC component of the rectified waveform to pass therethrough, and a third rectifier rectifying a ripple component of the AC component to generate a discharging signal; and a discharging unit discharging a voltage charged in the first capacitor through a discharging resistor connected between an output terminal of the first rectifier and a ground according to the discharging signal.

8. The circuit of claim 7, wherein the second rectifier includes:

a first diode having an anode connected to a first line of the AC power line;

a first resistor having one end connected to a cathode of the first diode;

a second diode having an anode connected to a second line of the AC power line;

a second resistor having one end connected to a cathode of the second diode; and a second capacitor having one end connected to the other ends of the first and second resistors and the other end connected to the ground.

9. The circuit of claim 8, wherein the third rectifier includes:

a third diode having a cathode connected to the blocking capacitor and an anode connected to the ground;

a fourth diode having an anode connected to the blocking capacitor; and a third capacitor having one end connected to a cathode of the fourth diode and the other end connected to the ground.

\* \* \* \* \*